No. 810,376. PATENTED JAN. 16, 1906.
J. H. McCORMICK & J. D. MORRISON.
CASH INDICATOR AND RECORDER.
APPLICATION FILED APR. 5, 1895.

10 SHEETS—SHEET 7.

Witnesses
Geo. Bohnenkemper
G. M. Gridley

Inventors
John H. McCormick
James D. Morrison
By their Attorney

No. 810,376. PATENTED JAN. 16, 1906.
J. H. McCORMICK & J. D. MORRISON.
CASH INDICATOR AND RECORDER.
APPLICATION FILED APR. 5, 1895.

10 SHEETS—SHEET 8.

Witnesses
Geo. Bohnenkamper
J. M. Gridley

Inventors
John H. McCormick
and James D. Morrison
By their Attorney

No. 810,376. PATENTED JAN. 16, 1906.
J. H. McCORMICK & J. D. MORRISON.
CASH INDICATOR AND RECORDER.
APPLICATION FILED APR. 5, 1895.

10 SHEETS—SHEET 9.

Witnesses
Geo. Bohnenkemper
G. M. Gridley

Inventors
John H. McCormick
and James D. Morrison
By their Attorney

No. 810,376. PATENTED JAN. 16, 1906.
J. H. McCORMICK & J. D. MORRISON.
CASH INDICATOR AND RECORDER.
APPLICATION FILED APR. 5, 1895.

10 SHEETS—SHEET 10.

Witnesses
F. L. Walker
Carl I. Welch

Inventors
John H. McCormick
and James D. Morrison
By their Attorney

UNITED STATES PATENT OFFICE.

JOHN H. McCORMICK AND JAMES D. MORRISON, OF COLUMBUS, OHIO, ASSIGNORS, BY MESNE ASSIGNMENTS, TO THE INTERNATIONAL REGISTER COMPANY, OF COLUMBUS, OHIO, A CORPORATION OF OHIO.

CASH INDICATOR AND RECORDER.

No. 810,376.      Specification of Letters Patent.      Patented Jan. 16, 1906.

Application filed April 5, 1895. Serial No. 544,583.

*To all whom it may concern:*

Be it known that we, JOHN H. McCORMICK and JAMES D. MORRISON, citizens of the United States, residing at Columbus, in the county of Franklin and State of Ohio, have invented certain new and useful Improvements in Cash Indicators and Recorders, of which the following is a specification.

Our invention relates to improvements in cash registers and indicators; and it especially relates to that class of cash-registers in which a single keyboard is adapted to control registering devices which while operated by common actuating devices are nevertheless independent so far as the registration of amounts thereon is concerned. Some of the features of our invention, however, are capable of use with registers of different types, as will more clearly appear hereinafter.

One of the objects of this invention is to provide in a cash-register devices by means of which the amount registered on each of a series of registering devices may be recorded in a tabulated form, thus showing in detail each and every transaction in which the machine was used.

A further object of our invention is to improve on the construction set forth in the patents of John H. McCormick, Nos. 570,141 and 610,365.

We attain these objects by the constructions shown in the accompanying drawings, in which—

Figure 1:
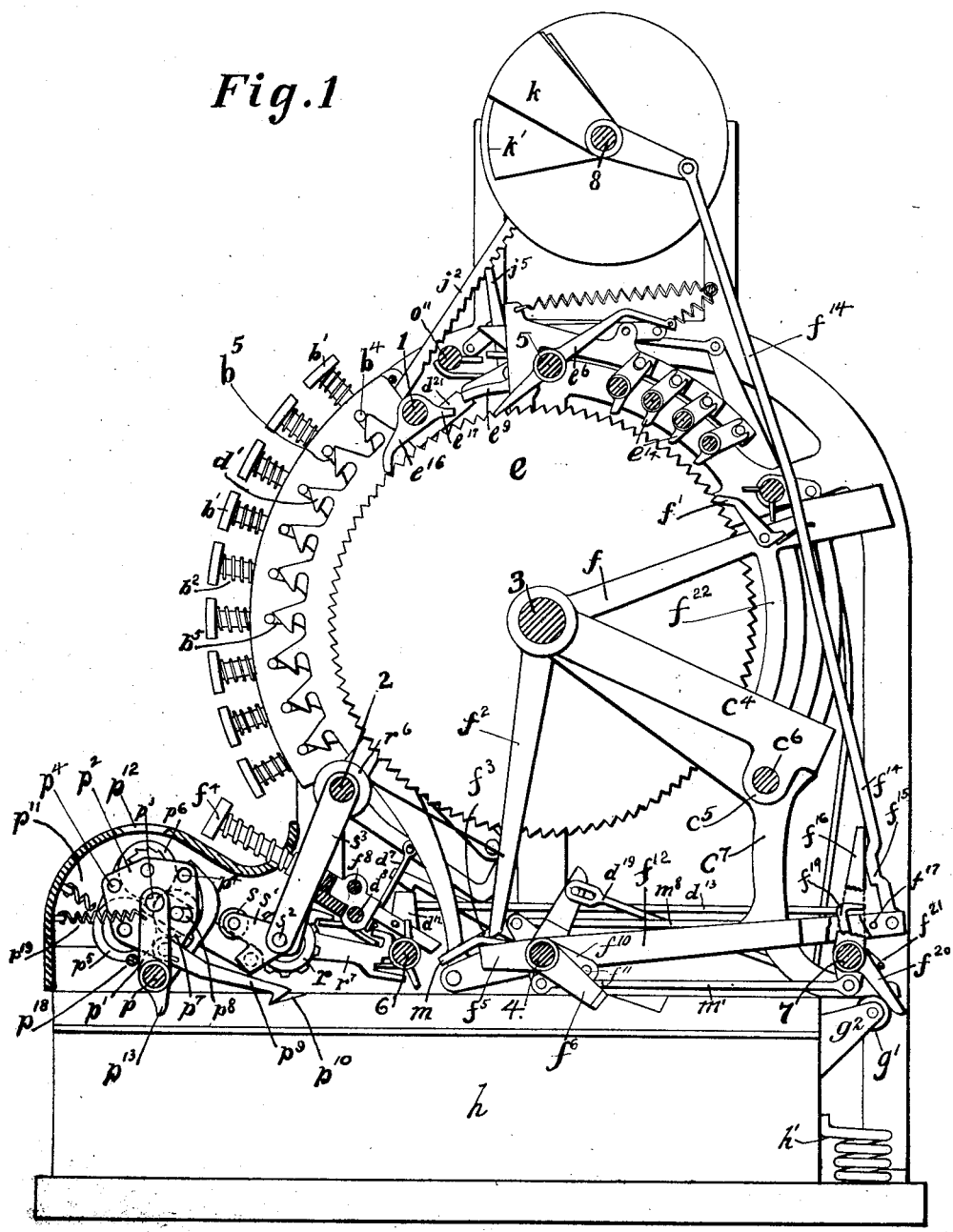
Figure 2:
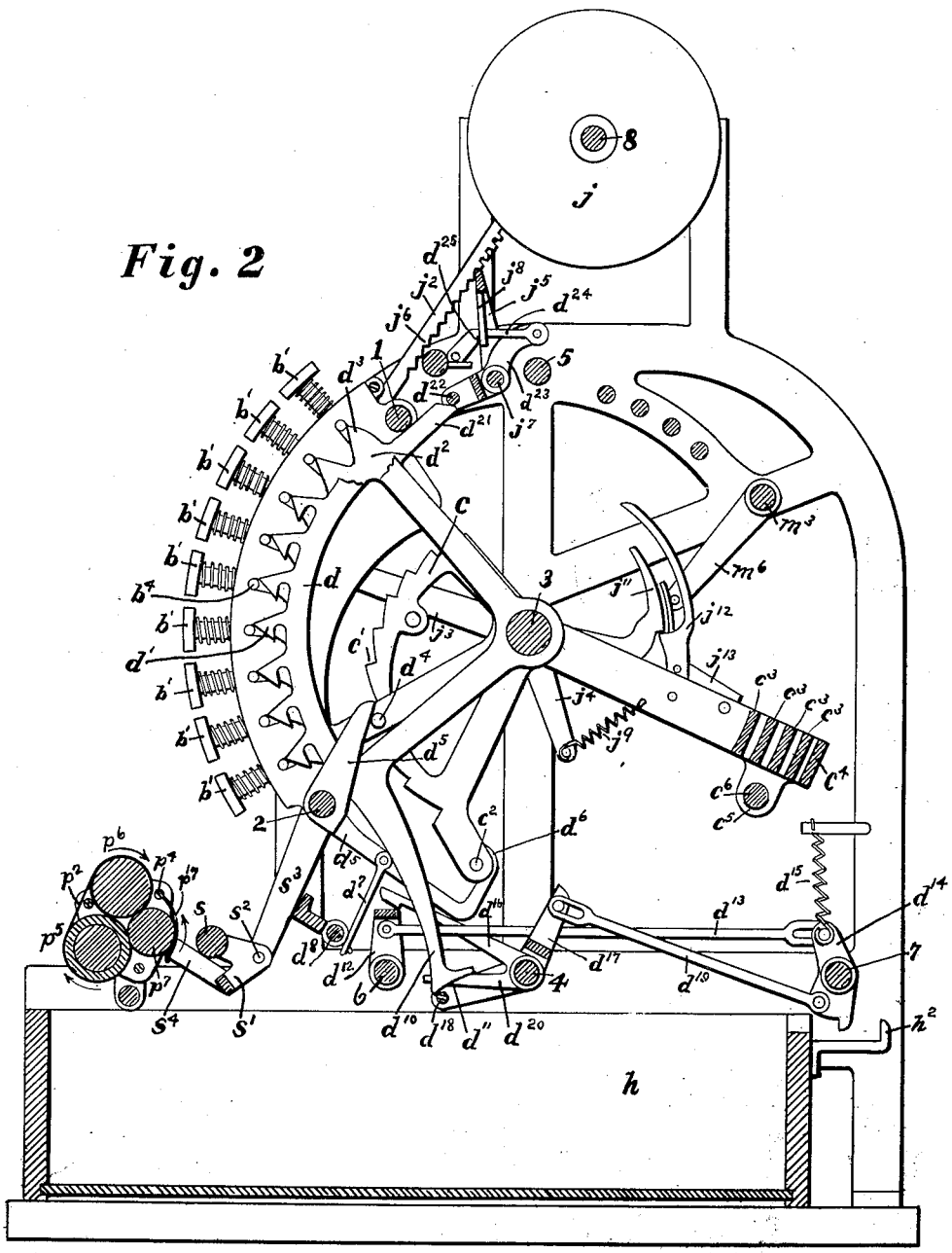
Figure 3:
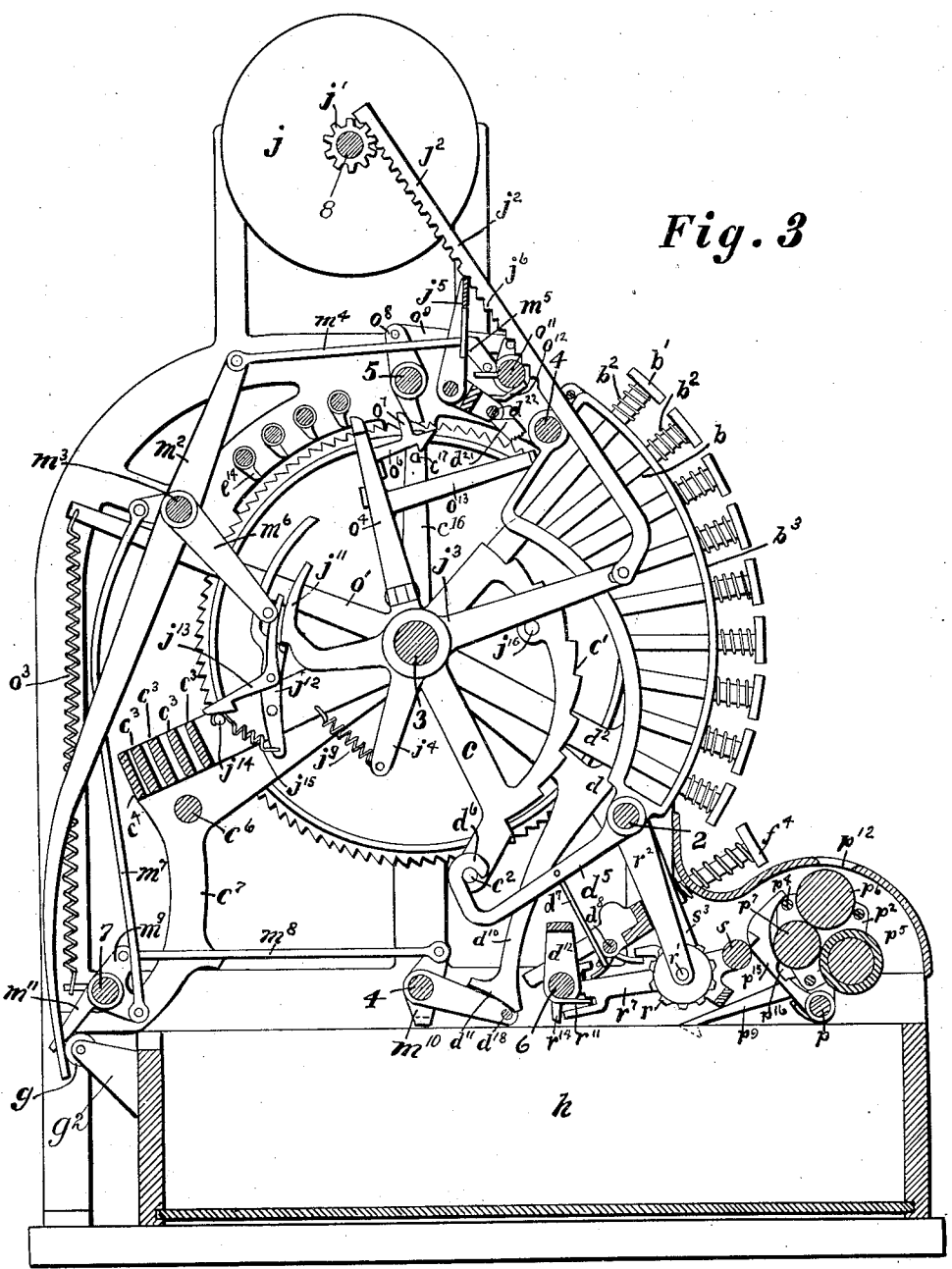
Figure 4:
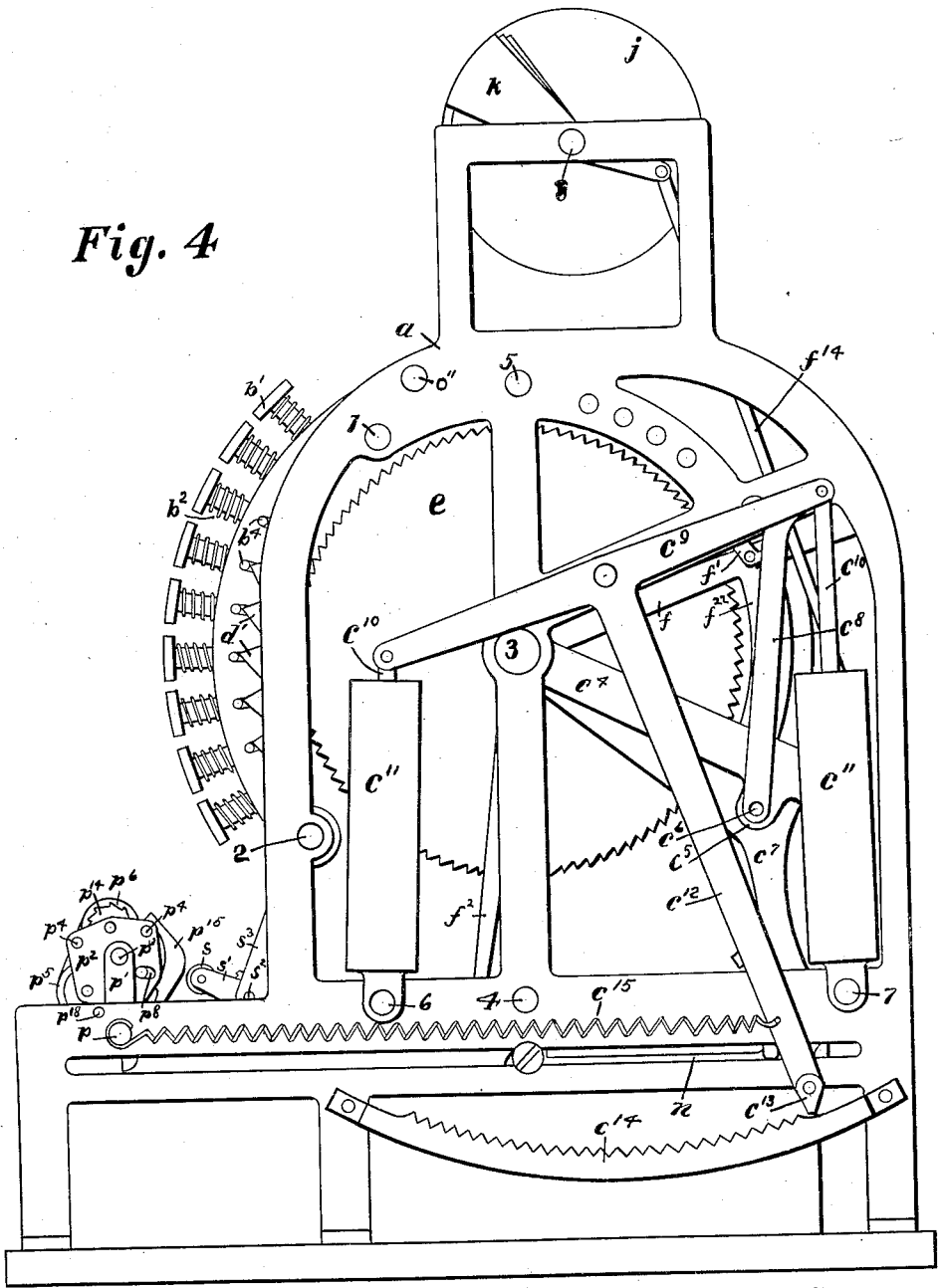
Figure 5:
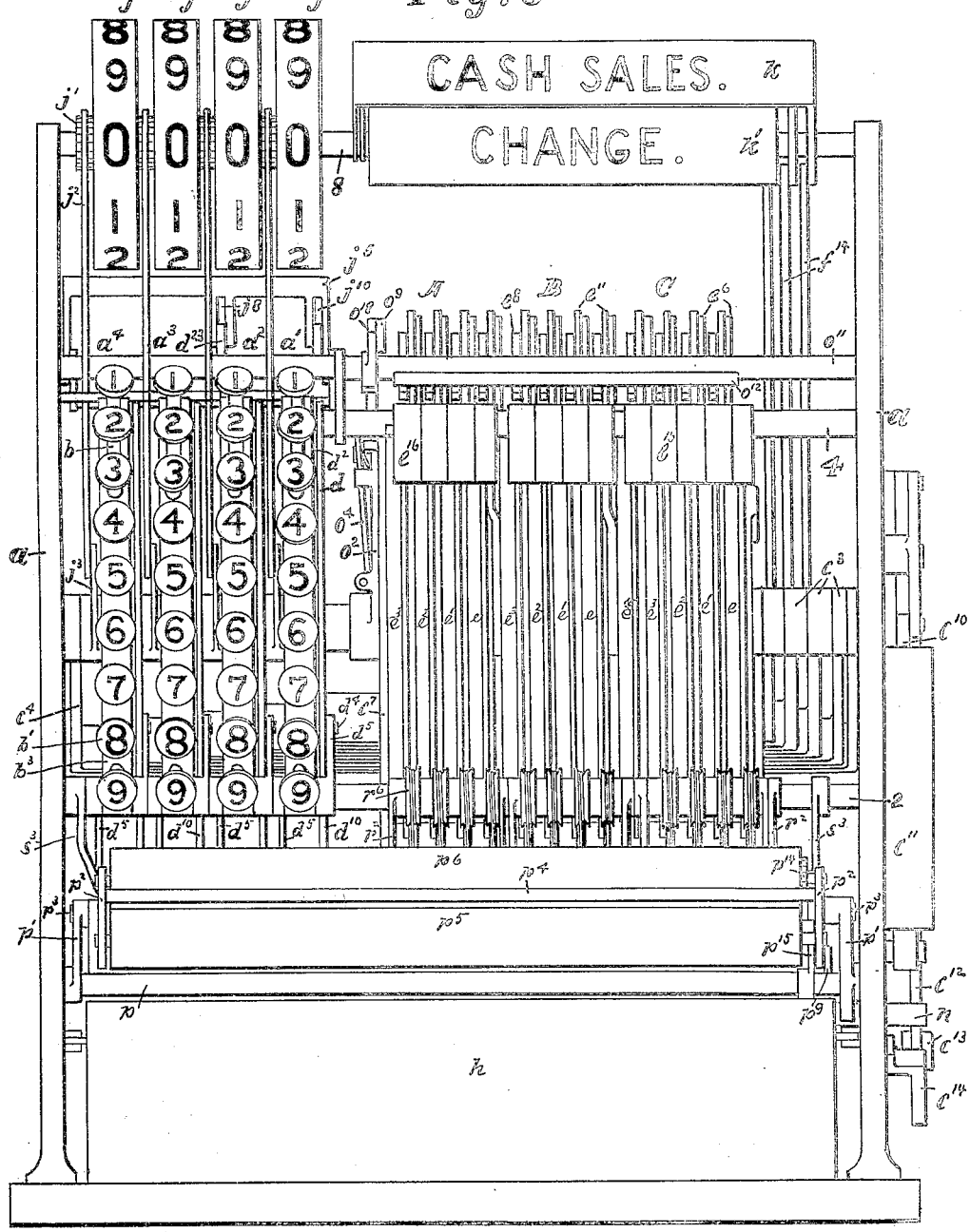
Figure 6:
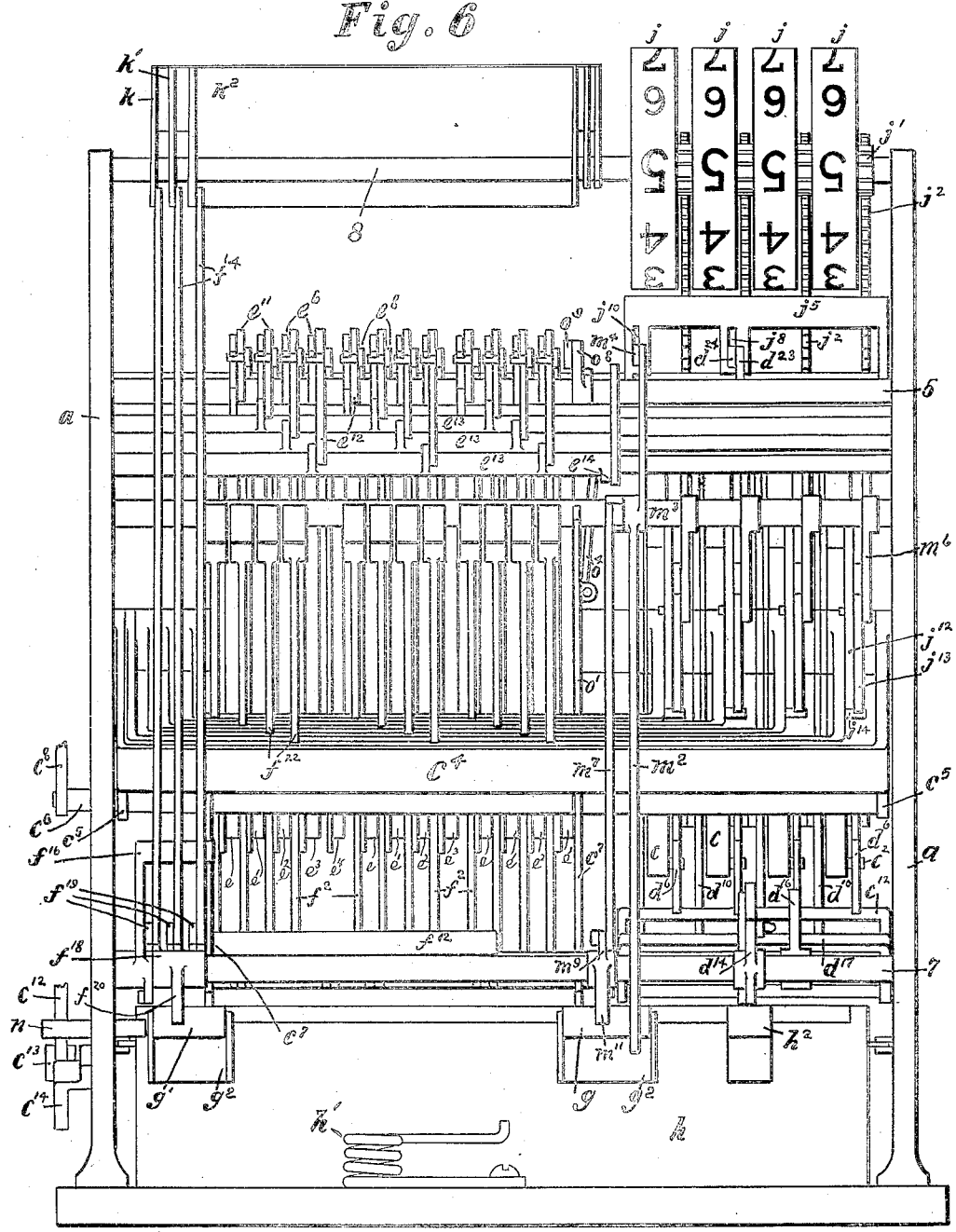
Figure 7:
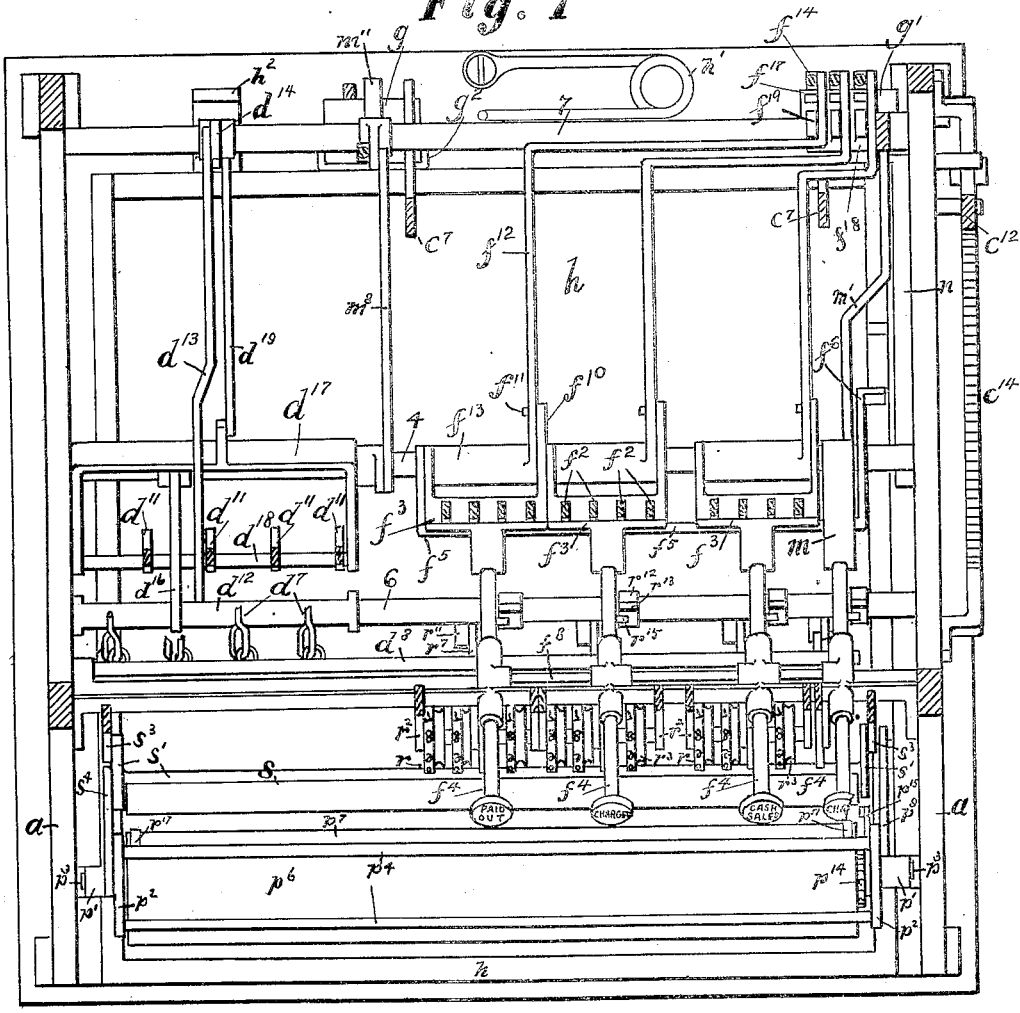
Figures 8, 9, 15:
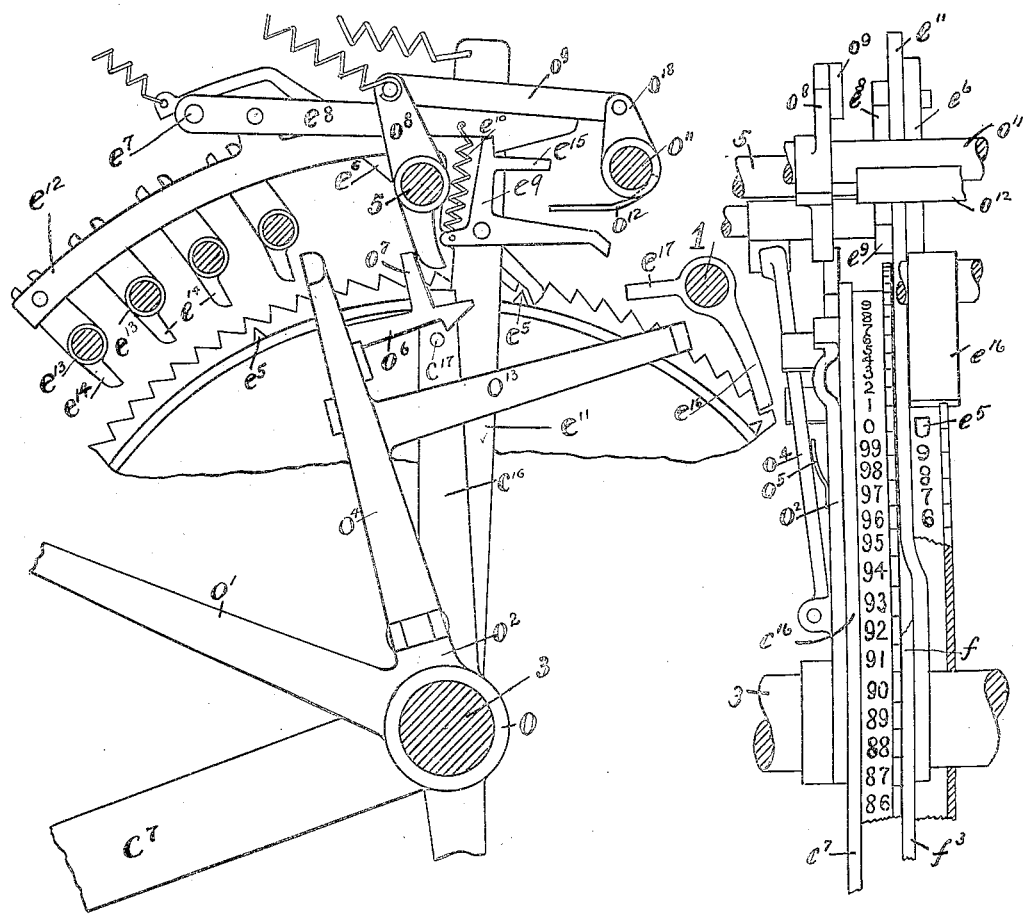
Figure 10:
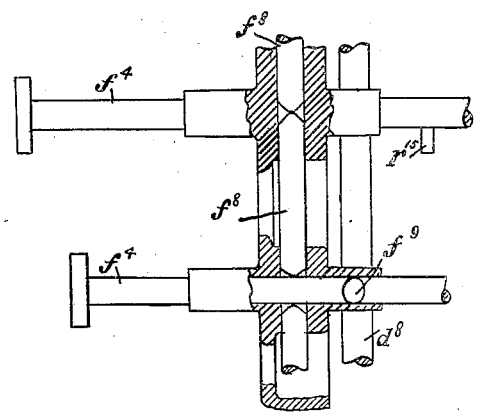
Figure 11:
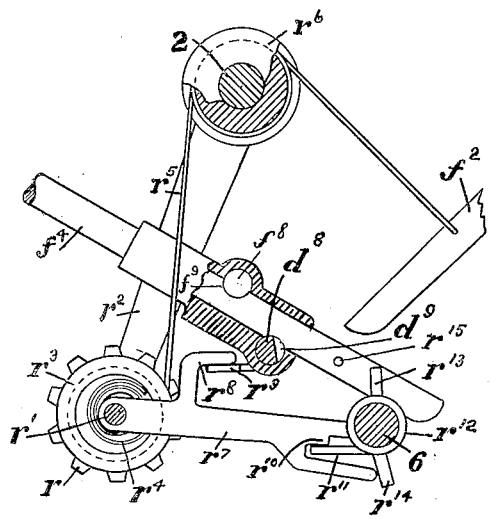
Figure 13:
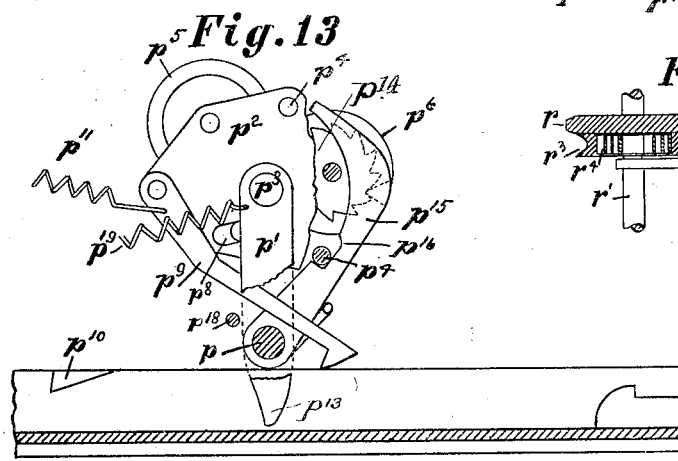
Figure 12:
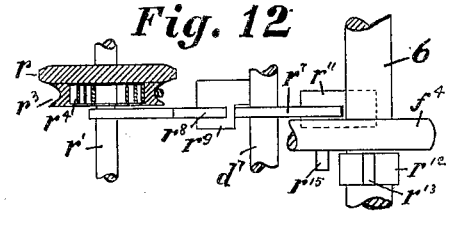
Figure 14:
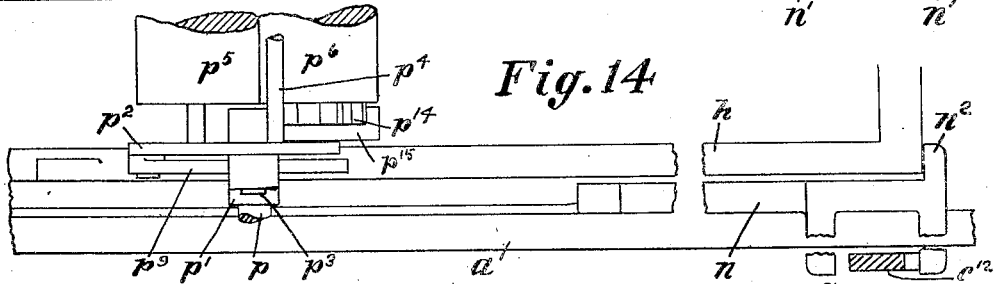
Figure 16:
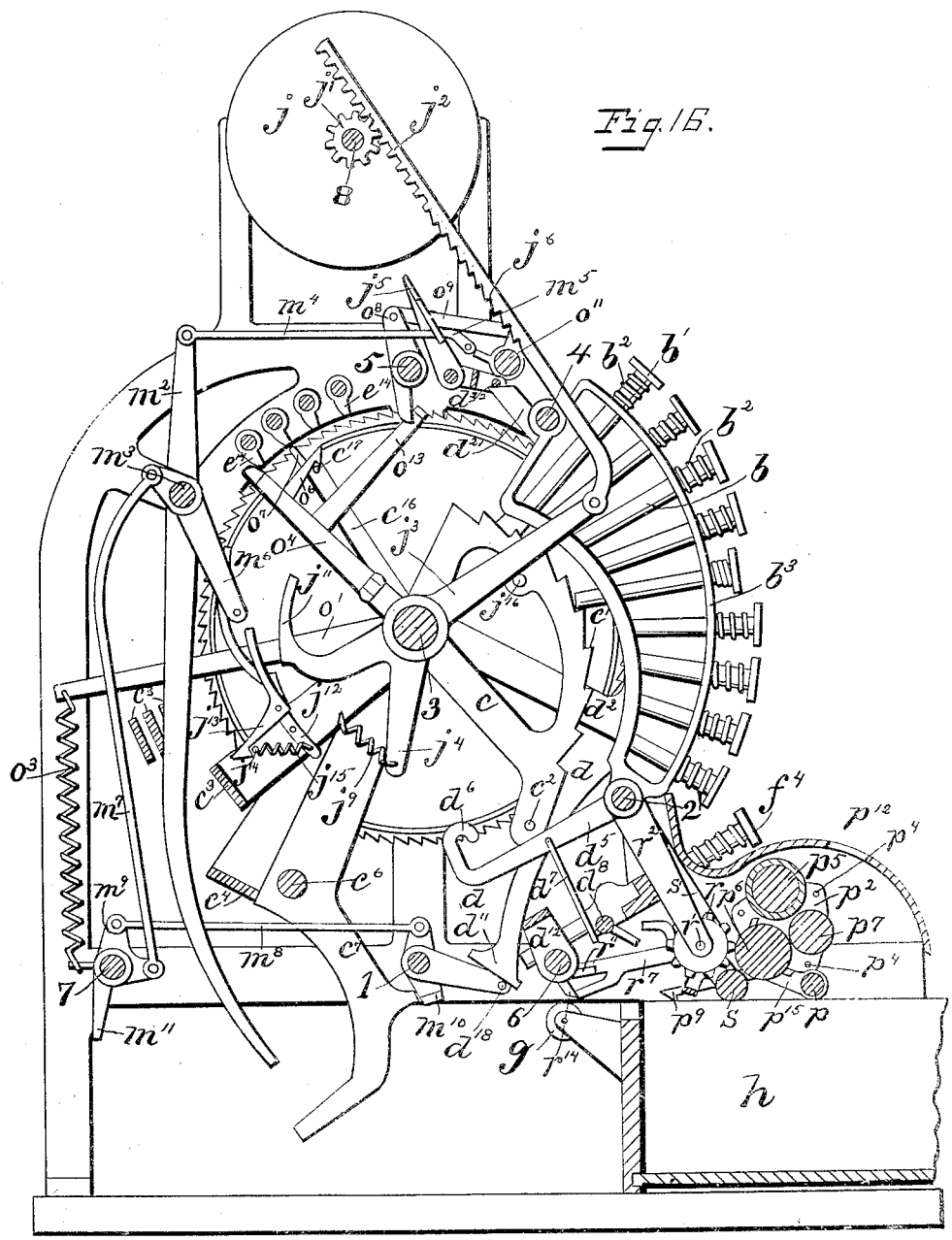

Figures 1, 2, and 3 are each transverse sectional elevations of a machine embodying our invention, Fig. 1 being practically an end view with the end frame removed, Fig. 2 being taken on a plane extending through the keyboard and looking in the same direction as Fig. 1, Fig. 3 being taken on substantially the same plane and looking in the opposite direction. Fig. 4 is an end elevation with the casing removed. Fig. 5 is a front elevation. Fig. 6 is a rear elevation. Fig. 7 is a horizontal sectional view on a plane just above the cash-drawer. Figs. 8 and 9 are respectively a side and front elevation of a portion of the adding mechanism, showing particularly the means for transferring amounts of one denomination to the registering-wheels of a higher denomination. Fig. 10 is a detail, partly in section, showing the arrangement of the department-keys. Fig. 11 is a sectional elevation of a portion of the same and the means for operating the printing or recording devices. Fig. 12 is a plan view of some of the parts of Fig. 11. Fig. 13 is a side elevation of the printing or recording devices. Fig. 14 is a plan of a portion of the same. Fig. 15 is a detail view of a special or change key and some of its connecting mechanism. Fig. 16 is a transverse sectional elevation of a machine embodying my invention, showing the parts when the cash-drawer has been operated.

Like parts are represented by similar characters of reference in the several views.

The main frame, on which all ot the operating devices are supported, consists, essentially, of end pieces $a\ a$, which are connected together by a series of rods or shafts, numbered, respectively, from 1 to 8, and on which various parts of the mechanism are supported. This frame is placed within a casing; but for convenience the casing has been omitted from all of the views. As in the patents referred to, a keyboard is provided at one end of the frame, the keys thereon being arranged in series, as shown at $a'\ a^2\ a^3\ a^4$, each series being provided with nine keys, numbered from 1 to 9, inclusive. The keys in each series are duplicates of those in the other series, and all the keys are alike except in the length of the stems. They each consist, essentially, of a stem $b$, having at one end a button $b'$ and provided with a spring $b^2$ for holding the key in and returning it to its normal position. The keys of each series are all slidingly mounted in a curved frame $b^3$, which is supported at each end on the frame-rods 2 and 4. (See Fig. 3.) Each key has a laterally-projecting pin $b^4$, which projects through a slotted opening $b^5$ in the frame. As in the said patents referred to, a swinging frame $c$ is employed opposite to the series of keys, having on its periphery steps $c'$ to contact with the respective key-stems when the same are depressed, so as to determine the movement of said frame when released. The projecting pins $b^4$ on the keys are each adapted to contact with a segment $d$, having beveled hook-shaped projections $d'$, which engage with said pins and retain them when depressed to the limit of their movement. A similar but independent segment $d^2$ is employed at the side of and adjacent to the segment $d$ and has similar beveled projections $d^3$, except that they are not hook-shaped. This segment $d^2$, which we will term the "plain" segment, is provided with a projection $d^4$, adapted to contact with one arm of a bell-crank lever $d^5$, the other arm of which is provided with a hook $d^6$ to engage a lug or projection $c^2$ on the swinging frame $c$, the bell-crank lever being mounted on the frame-rod 2. As a key is depressed the projecting pin $b^4$, contacting with the beveled projections on each of the segments $d$ and $d^2$, moves said segments simultaneously about the rod 3, on which they are journaled. As soon as the key is depressed to its limit the segment $d$ returns by gravity to its normal position and engages the pin or projection on the key and holds it. The segment $d^2$, however, remains in the position to which it is forced by the depression of the key and by its movement oscillates the bell-crank lever $d^5$ sufficiently to cause the hook $d^6$ to disengage the pin $c^2$ on the swinging frame $c$ and allow it to move until it contacts with the key which is depressed. In the patents referred to a single segment $d$ was employed for retaining the keys when depressed and for releasing the swinging frame. In this application one segment retains the keys, while the other segment releases the frame, and this arrangement makes it impossible to release the frame, and thereby place the registering mechanism in position for operation until the key is engaged by the other segment $d$, which we term the "hook-segment."

Each of the swinging frames $c$ has connected thereto a bar $c^3$, which extends across the frame and across the different series of registering devices to form intermediate actuating devices which determine the amount to be registered. On this machine the registering devices are arranged in groups or departments, which we have designated A, B, and C. Any number of these departments may be employed and may be used for keeping account of different classes of merchandise, of different character of sales, or the transactions of different salesmen. In the present drawings we have illustrated three of these departments as used, respectively, for cash sales, for sales charged, and for amounts paid out. If desired, an additional device may be employed which shall register the total of any number of departments desired, as in the patents referred to; but such total-registering device is not deemed necessary in a machine such as illustrated here in view of the recording device which will be hereinafter described. Each registering device consists of a series of toothed wheels $e$ $e'$ $e^2$ $e^3$ $e^4$, each adapted to register units, tens, hundreds, thousands, or any other denomination which may be required. In the present machine we have shown one hundred teeth in each registering-wheel and provided mechanism by which for every ten units registered on one wheel the wheel of the next higher denomination is moved one unit or notch. Adjacent to each of the registering-wheels $e$, $e'$, $e^2$, and $e^3$ is a pawl-lever $f$, journaled concentrically with the said registering-wheels on the rod 3, each carrying a pawl $f'$, which engages with the teeth in its adjacent wheel. Each of these pawl-levers $f$ is also provided with a projection $f^2$, the end of which is engaged by a swinging catch $f^3$, common to all the levers in the series, each of said swinging catches being journaled on the rod 4 and adapted to be turned on said rod by a key $f^4$, the stem of which is projected into proximity to said swinging catch. The pawl-levers $f$ are each further provided with a downwardly-projecting stem $f^{22}$, which normally rests on one of the actuating-bars $c^3$, the different pawl-levers for the different denominations in each series being in contact with a different bar and all the pawl-levers of the same denomination in the different series being in contact with the same bar.

Surrounding the bars $c^3$ when in their normal positions is a U-shaped frame $c^4$, the ends of which are perforated and journaled on the rod 3. This frame $c^4$ is provided at each end with perforated depending lugs $c^5$, through which is extended a rod $c^6$, which connects the two ends of said frame and also passes through pivoted levers $c^7$, of which there are two, one at each end of the series of registering wheels, which are threaded on said rod and constitute, in effect, a part of said frame, said levers $c^7$ being extended downwardly and backwardly and normally rest on rollers $g$ $g'$, journaled in suitable frames $g^2$, attached to the rear of the cash-drawer $h$. (See Figs. 1, 6, and 7.) The depression of a key in any series on the keyboard releases a swinging frame, to which is attached the actuating-bar $c^3$, corresponding to the denomination of said series. By depressing one of the keys $f^4$ the pawl-levers of the registering device to which said key relates are unlocked by turning the swinging catch $f^3$. The bars $c^3$, however, are held in their normal positions by the frame $c^4$, as each of said bars rests on the levers $c^7$, and these levers rest on the rollers $g$ $g'$ of the cash-drawer. The rod $c^6$ of the frame $c^4$ is extended at one end beyond the frame-pieces $a$ and is connected by a link $c^8$ to an oscillating bar $c^9$, pivotally connected at each end to piston-rods $c^{10}$, the pistons of which operate in dash-pots $c^{11}$, which are filled with some suitable material to prevent the rapid movement of the pistons therein, and thus furnish a governor to control the movement of the frame $c^4$ in either direction. The bar $c^9$ is formed integral with a projecting stem $c^{12}$, having at the bottom a swinging pawl $c^{13}$, adapted as the bar is moved to travel along a ratchet $c^{14}$ and prevent the movement of said bar in one direction after it has started in the opposite direction until it has completed its movement and permitted the pawl to reverse at the end of the ratchet. A spring $c^{15}$, connected to the stem $c^{12}$ at one end and to the frame at the other, serves to move said bar when released.

Journaled on the frame-rod 4 is a U-shaped frame $f^5$, which extends under and in proximity to each of the swinging catches $f^3$. One end of this frame is extended beyond the rod 4 and is provided with a lug or projection $f^6$, which engages with the cash-drawer $h$ and locks the same. When either one of the keys $f^4$ is moved sufficiently to oscillate one of the swinging catches $f^3$, the frame $f^5$ is turned on the rod 4, so as to raise the lug or projection $f^6$ out of engagement with the drawer to permit the same to be opened by the aid of a spring $h'$ in the usual manner. (See Figs. 1, 6, and 7.)

Connected to each of the bell-crank levers $d^5$ by a small link connection $d^7$ is an oscillating rod or shaft $d^8$, which extends longitudinally across the greater portion of the machine (see Figs. 2 and 7) and is journaled in the bearings which support the department-keys $f^4$. These keys or their stems are each provided with a notch $f^7$, in which the shaft $d^8$ normally rests and normally prevents the movement of the key $f^4$. The shaft $d^8$, however, is provided with a notch $d^9$ opposite to the key, which when turned to a position in line with said key-stem permits said key-stem to be moved longitudinally. (See Fig. 15.) The movement of either of the bell-cranks produces the necessary movement of the shaft $d^8$ to unlock each of the department-keys $f^4$.

Extending from one department-key $f^4$ to the other is a series of short rods $f^8$, which meet when in the normal position over one or more of said keys and rest in a notch $f^9$ on one side of the key-stem. These rods are permitted sufficient movement to allow the separation of the rods over either one of the keys sufficient to disengage the notches $f^9$ from the ends of two of the rods; but when so separated all the other keys are locked, so that only one department-key can be moved at one time, and when one is moved another one may not be moved until the department-key is returned to its normal position. (See Fig. 10 for detail.)

Over each series of keys is an indicating-wheel $j$, having thereon a pinion $j'$, adapted to be engaged by a rack $j^2$. These indicating-wheels have on their peripheries numbers corresponding to the numbers of the keys of each series. The racks are each connected to an arm $j^3$, pivoted on the frame-rod 3 and resting normally in contact with a pin $j^{16}$ on one of the swinging frames $c'$. Any movement of said frame, therefore, produces a corresponding movement of the indicating-wheel, and as the movement of said frame is determined by the key which is depressed the indicating-wheel will expose the number corresponding to said key, it being understood that these indicating-wheels are inclosed in a suitable casing having an opening through which the number thereon is displayed in the usual manner.

A key in one or more series on the keyboard having been depressed and followed by the depression of a department-key, the swinging frame $c$ of such series will be released and the drawer unlocked. As the drawer is unlocked it will be opened by the spring $h'$, and this will be followed by a movement of the frame $c^4$, the bar $c^3$, connected to such of the graduating frames as have been released, and the pawl-levers $f$ of the department whose key has been depressed. The drawer being connected only to the spring $h'$ will be thrown open instantly. The other devices, however, being operated by the spring $c^{15}$ and the T-shaped bar, to which the dash-pots or governor is attached, will be moved more slowly and uniformly.

At the top of the machine adjacent to the indicating-wheels is a series of targets $k$, one for each department, and each being adapted to be moved as the department-key is depressed. This is accomplished in the following manner: The swinging catch $f^3$ for each department is provided with a projecting arm $f^{10}$, having a lateral projection $f^{11}$, which engages with an angled arm $f^{12}$, formed on a sleeve $f^{13}$, which is journaled on the rod 4, the outer end of which is connected to a rod $f^{14}$, which leads to and is connected at its other end to one of the targets $k$. These targets with the exception of one which will be hereinafter more fully referred to are normally raised so as not to be visible through the opening which will be formed in the casing. As a key is depressed the target corresponding to said key is brought to view by means of the connections described. The rods $f^{14}$ are each provided with a shoulder $f^{15}$, adapted as the rod is moved longitudinally to contact with a swinging plate $f^{16}$, which engages under said shoulder and holds the target in position before the opening. The raising of one rod will disengage any other rods which have been previously raised, so that in displaying one target those which were previously visible are moved out of sight. To provide for locking the targets so that they will not be changed while the drawer is open, we provide on each of the angled arms $f^{12}$ a pin $f^{17}$, and on the frame-rod 7 is journaled a sleeve $f^{18}$, from which is extended a series of hooks $f^{19}$, one for each target. A projecting finger $f^{20}$ on this sleeve contacts with the roller $g'$ on the drawer and holds said hooks normally out of engagement with said pins. As the drawer is opened, however, said finger is released and the sleeve is turned by a spring $f^{21}$, so as to engage said pins, and thus lock the targets until the drawer is again closed so as to release them. (See Figs. 1 and 7.) Prior to the time the drawer is opened any key on the keyboard may be depressed. The pressing of any key in one series will release any other key in that series which has been depressed by moving the hook-segment, so as to release the pins on said key-stem. When the drawer is open, however, means are provided for positively locking all the keys in all the series. This is accomplished as follows: The hook-segments $d$ are each provided with an extended leg $d^{10}$, having at the end a foot $d^{11}$. Journaled on the shaft 6 (see Figs. 2 and 7) is a vibrating frame $d^{12}$, connected by a link connection $d^{13}$ to an oscillating lever $d^{14}$ on the shaft 7. This oscillating lever $d^{14}$ is held in a normal position by a spring $d^{15}$, but is capable of moving in either direction. A backwardly-extending projection $h^2$ on the drawer $h$ is adapted as the drawer is opened to contact with the lower end of the oscillating lever $d^{14}$, and thus draw the frame $d^{12}$ into contact with the legs $d^{10}$ on the hook-segments $d$, a pivoted hook $d^{16}$ on the rod 4 being adapted to engage the frame $d^{12}$ and hold it in contact with said legs $d^{10}$, and thus positively lock the hook-segments $d$. The end of the link $d^{13}$ where it connects with the oscillating lever $d^{14}$ is slotted so that said lever is permitted to return to its normal position, while the oscillating frame $d^{12}$ remains in contact with the legs $d^{10}$. As the drawer is closed, therefore, the projection $h^2$ again contacts with the lever $d^{14}$ on the opposite side and moves it in the opposite direction. Now there is journaled on the rod 4 an oscillating frame $d^{17}$, which has a transverse bar $d^{18}$ extending across and under the feet $d^{11}$ on the legs $d^{10}$. A link $d^{19}$ connects the frame $d^{17}$ to the oscillating lever $d^{14}$ on the opposite side of the center from the connection on the link $d^{13}$, so that as said oscillating lever is moved by the closing of the drawer the frame $d^{17}$ is oscillated and raises the legs $d^{10}$, thus moving the hook-segments $d$ out of engagement with the pins on the key-stems. The swinging hook $d^{16}$ has an auxiliary arm $d^{20}$, which also rests in contact with the bar $d^{18}$ of the swinging frame $d^{17}$, so that the first movement of said frame causes the swinging hook $d^{16}$ to become disengaged from the U-shaped frame $d^{12}$, thus unlocking the hook-segments and permitting them to be moved back to disengage the keys as the drawer is closed. As soon as the projection $h^2$ passes the oscillating lever $d^{14}$ all the parts assume their normal position. Whenever a key is depressed and the drawer opened, the amount is displayed by the indicating-wheels $j$. Means are provided by which these indicating-wheels are retained in position to show the last amount indicated thereby, even though the other parts are returned to their normal positions, which occur as the drawer is closed, as will be more fully described hereinafter. The indicators are retained in any position to which they may be moved by a swinging plate $j^5$, which is adapted to engage with ratchet-teeth $j^6$ on the rack-bar $j^2$, which operates each of the indicating-wheels. Whenever a key is depressed however, to register a succeeding amount, all the indicators are returned to their normal positions or to zero. This is accomplished through the following mechanism, which is best shown in Fig. 2: A spur $d^{21}$, beveled on the end, is formed on the plain segment $d^2$. The beveled end of this segment contacts with a rod or bar $d^{22}$ on a swinging frame $d^{23}$, which is journaled on the same shaft $j^7$ that carries the swinging plate $j^5$. A link $d^{24}$ is pivoted to the frame $d^{23}$, having a shoulder $d^{25}$. This link $d^{24}$ extends through a slotted opening $j^8$ in the swinging plate $j^5$. (See Fig. 5.) Whenever a key is depressed in the series, the movement of the plain segment, by reason of the spur $d^{21}$, causes the frame $d^{23}$ to oscillate, and thus withdraws the swinging plate $j^5$ from contact with the ratchet-teeth $j^6$ in the rack-bars, allowing the indicating-wheels to return to zero, which they do by reason of a spring $j^9$, which connects the swinging arm $j^4$ with the extension of the swinging frame $c$. (See Figs. 2 and 3.)

Means are provided by which the drawer may be opened without operating either the department-keys or any of the keys in the keyboard, and when so operated all the indicating-wheels will be turned to the zero-point and the targets indicating the department in use also moved out of sight. To accomplish this, we provide a separate key, which we term the "change-key." This change-key, which is shown at the right in Fig. 7, is a duplicate of the other department-keys $f^4$; but instead of operating against a swinging catch it contacts with a swinging plate $m$, journaled on the frame-rod 4 and resting above the swinging frame $f^5$, so as to operate the drawer-lock $f^6$ when depressed. Connected to a lug on the plate $m$ is a rod $m'$, the other end of which is connected to a lug on the bottom of the swinging plate $f^{16}$, so that as the plate $m$ is depressed the swinging plate $f^{16}$ is withdrawn from the shoulder $f^{15}$ on the target-rods $f^{14}$, which by reason of the weight of the rods and assisted by a spring, if desired, are moved away from the opening in the front of the casing through which they are displayed. These targets, which are preferably formed on the arc of a circle, each target being a little farther removed from the center of said circle than the other, are adapted to be moved in front of a stationary target $k'$, which is marked "Change" and is always in sight unless one of the department-targets is moved in front of it.

To provide for releasing the indicator-wheels when the drawer is opened by the change-key—that is to say, without operating a key on the keyboard—we employ a lever $m^2$, pivoted on a shaft $m^3$ and contacting at one end with a roller $g$ and at the other end pivoted to a link $m^4$, which extends through a slotted opening $j^{10}$ in the swinging plate $j^5$ and is provided with a shoulder $m^5$ to engage said plate, so that as the lever is oscillated, which occurs by gravity when the drawer is opened, the plate $j^5$ is moved to release the rack-bars connected to the indicator-wheels and permit them to return to their normal positions or zero. (See Figs. 3, 5, and 6.)

Whenever the drawer is opened, therefore, all the indicator-wheels are released and return to their normal positions unless a key on the keyboard has been depressed to release the intermediate actuating mechanism for the registering devices, which in that case would move with the opening of the drawer and carry the indicating-wheels to the proper position, as before explained.

To provide against the overrunning of the indicating-wheels and to cause them to stop at the proper point when moved by the intermediate actuating devices, we construct on the end of each of the arms $j^3$ a curved extension $j^{11}$, which normally rests in contact with a swinging stop-lever $j^{12}$, pivoted to the vibrating frame $c$ on the opposite side of the rod 3 from the arm $j^3$. When a swinging frame $c$ moves, therefore, this arm $j^3$ moves positively therewith, being connected thereto on opposite sides of the center of movement. When the actuating mechanism is returned to its normal position by the closing of the drawer, the swinging stop-lever $j^{12}$ is moved out of contact with the extension $j^{11}$, so that the actuating devices may return to the normal position, while the indicators are left in a position to indicate the amount last registered. This is accomplished by rocking the shaft $m^3$ to cause an arm $m^6$ thereon to engage with the stop-lever $j^{12}$ and move it out of contact with the extension $j^{11}$. The proper movement is imparted to the shaft $m^3$ through the medium of connecting-rods $m^7$ $m^8$ and a bell-crank lever $m^9$ from an oscillating lever $m^{10}$, journaled on the rod 4. This lever $m^{10}$ stands in line with one of the levers $c^7$, so that when it drops on the opening of the drawer the oscillating lever $m^{10}$ is moved so as to rock the shaft $m^3$, and thus turn the stop-lever $j^{12}$ until the pivoted latch $j^{13}$ thereon engages on a projection $j^{14}$ on the actuating device $c$. A spring $j^{15}$ returns the stop-lever $j^{12}$ to its normal position when released by the catch $j^{13}$, which is accomplished by returning the shaft $m^3$ to its normal position by the movement of the bell-crank lever $m^9$, caused by the contact of a spur $m^{11}$ thereon with the roller $g$ as the drawer is closed. (See Fig. 3.)

A loose connection is established between the drawer and the intermediate actuating devices through the medium of a slide $n$, (see Figs. 4, 13, and 14,) which is supported in a suitable bearing on one of the end pieces $a$ of the frame and is provided on one side with lugs $n'$ $n'$ and on the other side with a single lug $n^2$. The lugs $n'$ $n'$ are adapted to rest on opposite sides of the arm $c^{12}$, connected to the actuating devices, while the lug $n^2$ is adapted to contact with the rear end of the drawer $h$. As the drawer opens it moves independently of the actuating devices, as before described. As the drawer closes the actuating devices are moved thereby through the agency of the slide $n$ just described. The dash-pots, which constitute the governor, prevent the rapid movement of the actuating devices in either direction, while the drawer is permitted to open rapidly. In closing, however, the speed of the drawer also is limited by the governor, so that all danger of disarranging any of the parts and the wear subject to sudden jar in operating the actuating devices quickly is prevented.

It will be understood from the above that the actuating devices which are released when the drawer is opened are returned to their normal position when the drawer is closed and carry therewith all the pawl-levers which have been released by the department-keys, and thus register the amounts which have been indicated by pressing any of the keys on the keyboard.

To provide for transferring an amount on the registering-wheel of one denomination to that of a higher denomination whenever a certain number of units of said denomination has been registered to make up a unit of the next higher denomination, we construct on each of the registering-wheels, except the highest in the series, auxiliary teeth $e^5$ opposite every tenth tooth in the registering-wheel. These teeth $e^5$ are adapted to contact as the wheel revolves with a spring-actuated pivoted lever $e^6$, the opposite end of which engages with a pin $e^7$ on a pivoted catch $e^8$, which engages a pawl $e^9$, arranged opposite to the registering-wheel of the next higher denomination, said pawl and catch-lever being connected together by a spring $e^{10}$. The pawl $e^9$ and the catch $e^8$ are each pivoted to a lever $e^{11}$, which is journaled on the rod 3 and has a backwardly-extending spur $e^{12}$. One of these levers $e^{11}$ is employed for each wheel except the highest denomination, and each one is connected to one arm of a rock-shaft $e^{13}$ in the nature of a sleeve, each of which has at one end a lug $e^{14}$, which lugs are all arranged in the same plane.

Pivoted on the shaft 3 at a convenient point in its length is a sleeve $o$, which has two projecting arms or prongs $o'$ $o^2$. The arm $o'$ is connected to one end of a spring $o^3$, the opposite end of which is connected to the frame-rod 7. (See Figs. 3, 8, and 9.) To the prong $o^2$ is hinged an arm $o^4$, which is connected to said arm, so as to move therewith when the same is turned with the sleeve $o$, but is permitted a slight lateral movement against the spring $o^5$. This hinged arm $o^4$ stands normally in line with the lugs $e^{14}$ on the respective rock-shafts $e^{13}$ and is adapted to contact successively therewith and produce a slight movement of said rock-shaft when the arm is released and actuated by the spring $o^3$. The end of the arm $o^4$ and the rear of the lugs $e^{14}$ are beveled to permit the arm $o^4$ to be turned to its upright position without moving said rock-shaft, the arm in this case being moved laterally, so as to pass said lugs. The arm $o^2$ has pivoted thereon a hook-shaped catch-lever $o^6$, having thereon a spur $o^7$. One of the bars $c^7$ has a spur $c^{16}$, on which is a pin $c^{17}$, with which the hook-lever $o^6$ is adapted to engage. Journaled on the frame-rod 5 in line with the spur $o^7$ is an oscillating lever $o^8$, connected by a link $o^9$ to the arm $o^{10}$ of a rock-shaft $o^{11}$, which has a projecting plate $o^{12}$, which stands in line with the projections $e^{15}$ of each of the pawls $e^9$. The lever or arm $o^2$ is normally drawn down to the limit of its stroke by the spring $o^3$. When the actuating devices are released by the opening of the drawer, the pin $c^{17}$ on the spur $c^{16}$ becomes engaged by the hook-lever $o^6$ and connects said arm $o^2$ to the actuating devices, so that as the drawer is closed said arm is moved with said actuating devices, thus elongating the spring $o^3$. As soon as the actuating devices have returned to their normal positions, thus completing the movement of each of the registering-wheels, the arm $o^4$ is released by the contact of the spur $o^7$ with the oscillating lever $o^8$, which withdraws the catch-lever $o^6$ from the projection $c^{17}$. The arm $o^2$, with its hinged auxiliary $o^4$, is caused then to move so as to successively contact with the lugs $e^{14}$ and through the rock-shaft $e^{13}$ impart successive impulses to the levers $e^{11}$, which carry the pawls $e^9$, this impulse being sufficient to produce a movement of those registering-wheels with which the pawls are engaged equal to one notch or one unit. The registering-wheels are each prevented from moving backwardly by the pawls $e^{16}$, pivoted on the frame-rod 1. Each of these pawls is provided with a spur $e^{17}$, which is in line with the pawl $e^9$ on the lever $e^{11}$ and is so arranged with reference to said pawl that as the lever $e^{11}$ is moved forward each of the pawls $e^9$ which are engaged with the registering-wheel will come in contact with a spur $e^{17}$ as soon as the registering-wheel has been advanced one notch or unit. The end of the pawl $e^9$ is slightly beveled, so that this contact with the spur $e^{17}$ forces the pawl $e^{16}$ more firmly in contact with the teeth of the wheel and also wedges the pawl $e^9$ in contact with said teeth, so that the wheel is thus positively stopped when moved one tooth and locked in this position so long as the pawl $e^9$ remains in contact with the spur $e^{17}$. The parts are returned to their normal positions as soon as the operation is completed through the agency of a spur $o^{13}$, which as the lever $o^2$ reaches the limit of its stroke contacts with the vibrating lever $o^8$, causing the same to vibrate, so as to oscillate the shaft $o^{11}$ to bring the plate $o^{12}$ in contact with the spur $e^{15}$ of the pawls $e^9$, thus raising said pawls out of engagement with the wheels and until they are engaged by the spring-actuated catch-levers $e^8$. The rock-shafts being arranged in successive order produce a successive movement of the adding-levers—that is to say, the lowest denomination is operated first and the highest last, so that the entire amount registered on one wheel will be carried forward to the next higher, the movement of one registering-wheel being sufficient to make a unit of the next higher. The adding or transferring device being operated after the registration of the actuating devices is complete, the registration of either of the wheels cannot in any way affect the accuracy of the transferring of the amount from one wheel to another. It is thus seen that each time the cash-drawer is operated the projecting prong $o^2$, with its hinged extension $o^4$, is moved back to its normal position, the projecting end of said hinged extension striking successively each of the lugs $e^{14}$, which causes each of the levers $e^{11}$, with their pawls $e^9$, to be oscillated. Whenever a registering-wheel has been moved ten teeth, the tooth $e^5$ strikes the pivoted lever $e^6$, which disengages the pivoted latch $e^8$ from the pawl $e^9$, thereby permitting the pawl to engage with its corresponding counting-wheel, being the wheel of the next higher denomination, so that in operation upon the return movement of the cash-drawer after the same has been opened the hinged extension $o^4$ is drawn against the tension of its spring $o^3$, the projecting end of the hinged extension $o^3$, the projecting end of the hinged extension passing the studs $e^{14}$ without operating same until the projection $o^7$ strikes the oscillating lever $o^8$, and the latch $o^6$ is thereby disengaged from the pin $c^{17}$, which disconnects the hinged extension $o^4$ from the actuating devices, and upon the return movement of the hinged extension $o^4$ to its normal position it will oscillate each of the pivoted levers $e^{11}$, giving same a movement equal to the movement of one tooth of the registering-wheels. Consequently if the lever connected to one of the registering-wheels has been oscillated by contact with the tooth $e^5$, and thereby the pawl of that registering-wheel has become disengaged from its latch $e^8$ and same has been thrown into engagement with its registering-wheel, upon the backward movement of said hinged extension $o^4$ the registering-wheel with which said pawl engages will be moved one tooth and the pivoted pawl will be returned to its normal position and into engagement with the pivoted latch $e^8$ by the spur $o^{13}$ contacting with the pivoted lever $o^8$ at the limit of the stroke of the lever $o^2$, as heretofore fully explained. It will be understood from this description that each time the cash-drawer is opened and closed all of the pivoted pawls are moved; but same are kept out of engagement with the registering-wheels until one registering-wheel has been moved ten teeth, and then the pivoted pawl corresponding to the registering-wheel of the next higher denomination is thrown into engagement with the registering-wheel, so that when the studs $e^{14}$ are moved by the projecting end of said extension $o^4$ the pivoted pawl will advance the said registering-wheel one tooth.

From the above description it will appear that any amount which may be indicated on the keyboard may be registered in any of the series of registering devices. To further provide for recording in detail the respective transactions indicated by the indicator and registered on the registering devices, we employ a printing device for each registering device in connection with suitable rollers, on which is placed a strip or strips of paper. This is accomplished in the following manner: In front of the casing and immediately over the drawer is a rock-shaft $p$, on which are secured supporting-arms $p'$ at or near each end. Between these arms and adjacent to each is a plate $p^2$, which has a central trunnion $p^3$, which is journaled in the end of each of said arms. These end plates $p^2$ are connected together by rods $p^4$, which extend from one plate to the other, thus forming a supporting-frame in which are three rollers $p^5$ $p^6$ $p^7$. Each of these rollers is journaled at each end in end plates $p^2$, the one, $p^7$, being supported at each end in a slotted opening $p^8$. Pivoted to one of the plates $p^2$ is a hook-shaped lever $p^9$, which engages normally in a notch $p^{10}$ in the cash-drawer $h$ when said drawer is closed. A spring $p^{11}$, connected from the frame to the hook-shaped lever $p^9$, tends to keep said arm in engagement with the drawer and also to turn the roller-frame upon the trunnions $p^3$. When the drawer is closed, the notch $p^{10}$ engaging with the hook-lever $p^9$ turns the roller-frame to the position shown in Fig. 1, with the roller $p^6$ opposite an opening $p^{12}$ in the top of the front part of the casing. When the drawer is opened and the hook-shaped lever released from the notch $p^{10}$, the spring $p^{11}$ turns the roller-frame until the roller $p^6$ occupies a position substantially at right angles to the position previously occupied, as shown in Fig. 13. Immediately in the rear of the roller-frame is a number of printing-wheels $r$, one for each registering-wheel, said printing-wheels being arranged in groups, one group for each registering device. The printing-wheels of each group are all journaled on a shaft $r'$, supported at each end by swinging arms $r^2$, which are pivoted or hinged to the frame-rod 2. Each of the printing-wheels $r$ has on one side thereof a drum $r^3$, within which is located a spiral spring $r^4$, one end of which is connected to the drum and the other to the shaft $r'$, on which the wheel is mounted. About the drum is wound a cord or cable $r^5$, which, passing over a supporting-pulley $r^6$ on the frame-rod 2, is connected to the pawl-lever $f^2$, one of said printing-wheels being thus connected to each of said pawl-levers. Whenever a pawl-lever, therefore, moves any distance around the registering-wheel, the printing-wheel is moved a corresponding distance. Each of the printing-wheels has on its face numbers from "1" to "9" and a "0," the zero being always normally toward the roller-frame. The limit of the pawl-lever is nine notches on the registering-wheel. This movement is sufficient to turn the printing-wheel nine spaces, so that for every notch which the pawl-lever is moved a corresponding number on the printing-wheel is brought forward to take the place of the normal zero. Extending backwardly from each series or group of printing-wheels is a push-bar $r^7$, which has an L-shaped spur $r^8$, adapted to normally rest in contact with a plate $r^9$ on the rock-shaft $d^8$, which locks the department-keys in the manner heretofore described. (See Fig. 11.) These push-bars $r^7$ are continued to a point adjacent to the frame-rod 6 and are bifurcated at their rear ends, and within the fork thus formed is a shoulder $r^{10}$, which is adapted under certain conditions to engage with a spur $r^{11}$, secured to said frame-rod 6. A sleeve $r^{12}$, also journaled on the rod 6, carries on each side oppositely-arranged projections $r^{13}$ and $r^{14}$, the one, $r^{14}$, being adapted to contact with the extremity of one of the fork portions of the push-bar $r^7$, the other being in line with a stud $r^{15}$ on the key-stems $f^4$ for each of the departments or registering devices. If one of the keys $f^4$, therefore, is depressed, the stud $r^{15}$, contacting with the projection $r^{13}$ on the sleeve $r^{12}$, moves the push-bar $r^7$ forwardly, carrying with it the series of printing-wheels corresponding to that department. Now if a key has been depressed on the keyboard the plate $r^9$ on the rock-shaft $d^8$ will be turned downwardly, releasing the spur $r^8$ on the push-bar. The rear end of the push-bar will therefore be permitted to drop with the shoulder $r^{10}$ in contact with the end of the spur $r^{11}$, thereby holding the push-bar in its changed position until released. Immediately in front of the series of printing-wheels extending substantially across the frame is an ink-roller $s$. (See Figs. 2 and 7.) This roller $s$ is journaled at each end in a frame $s'$, which in turn is pivoted at each end, as shown at $s^2$, to hinged bars $s^3$ from the frame-rod 2. This ink-roller $s$ normally stands in front of all the printing or type wheels and between said wheels and the roller-frame. The frame $s'$, however, is connected by a link $s^4$ to one of the end plates $p^2$ of the roller-frame, and as said roller-frame is turned on its trunnions, as before described, it turns the frame $s'$ on its trunnions $s^2$, thus moving said ink-roller downwardly and around the printing-wheels. The printing-wheels normally stand back of the ink-roller and contact therewith only when pushed forward by the operation of one of the department-keys, as before described, and when so advanced the ink-roller turns in contact with the type on said printing-wheels as they are revolved to their position. The ink-roller will further contact with the type in rolling away from its normal position as the roller-frame is turned on its trunnions, so that all the type on the printing-wheels which are advanced will be inked. On each of the pivoted arms $p'$ is a downwardly-extending lug $p^{13}$, which normally stands in line with the slide $n$, connected to the intermediate actuating devices of the register. As said actuating devices approach the limit of their first movement after the opening of the drawer the end of the slide $n$ contacts with the lug $p^{13}$, and thus oscillates the rock-shaft $p$, carrying with it the roller-frame and bringing the roller $p^6$ into contact with all those printing-wheels which have been advanced, as before described. It should be stated that the roller $p^5$ contains a strip of paper preferably wide enough to extend across the entire series of printing-wheels, although separate strips for each group may be employed, if desired. This strip passes around the roller $p^6$ and is rewound on the roller $p^7$, so that at each movement of the roller-frame against the type-wheels an impression is made from all those type-wheels which have been advanced, thus recording the exact amount which is registered in the department to which said printing-wheels belong. Means are provided for moving the paper a uniform distance each time the roller-frame is moved, which occurs each time the cash-drawer is opened, so that the arrangement of the numbers in the column representing the different groups of printing-wheels will show exactly the transactions registered on each registering device and the order in which they occur. The movement of the paper is accomplished as follows: The roller $p^6$ is provided at one end with a ratchet-wheel $p^{14}$, which when the said roller is turned toward the printing-wheels engages with a lug or projection on a spring-actuated arm $p^{15}$, which is hinged to one of the arms $p'$, this lug being shown in dotted lines in Fig. 13. As the roller-frame returns to its normal position, turning on the trunnion $p^3$, this lug engages with the ratchet-wheel and moves said roller sufficient to advance the paper to the proper distance. As the roller-frame revolves one of the bars $p^4$ in the frame contacts with a shoulder $p^{16}$ on the lever $p^{15}$, which moves said lever so as to disengage its lug from said ratchet-wheel when the roller has been turned the proper distance. It should be stated that the roller $p^7$ on which the paper is wound and which is journaled in the slotted opening $p^8$ at each end is pressed firmly between the rollers $p^5$ $p^6$ by a spring $p^{17}$, (see Fig. 2,) forming, as it were, an intermediate roller contacting with both of the other rollers and moved thereby. As the diameter of the roller $p^5$ decreases by withdrawing the paper therefrom that of the roller $p^7$ increases. The slotted opening permits the proper movement of the roller $p^5$ to compensate for this change in its diameter, so that it remains at all times in contact with each of the rollers $p^6$ and $p^7$. The roller $p^6$ will be covered with some suitable material to receive the impression of the type-wheels and also to supply the proper friction to move the paper when said roller is turned. A spring $p^{19}$, extending from the casing to the arms $p'$, serves to return the roller-frame to its normal position, which is determined by a stop $p^{18}$, secured to the end frame and adapted to contact with said pivoted arm. It will be noticed that the rollers are extended considerably beyond the printing-wheels, so that if the paper on said rollers is of a width equal to the length thereof a margin will be left on one edge of the paper. This margin is adapted to come under the opening $p^{12}$ in the front of the casing and will furnish the necessary space to write in the names of individuals to whom amounts are to be charged or any other remarks which may be desirable in connection with transactions registered and recorded.

In Fig. 15 we have shown the arrangement of the printing device for the change-key. It differs from the other devices in that it has only a single printing-arm $t$, on which is carried a zero. An L-shaped spur $t'$ on its push-bar $r^7$ is arranged on the opposite side of the shaft $d^8$ from those of the printing-wheel to coöperate with the plate $t^2$ on said shaft, so that the change-printing device is locked if either of the other department devices is unlocked, and vice versa. The printing device connected with the change-key therefore operates only at such times as the drawer is opened without the depression of any other key. If any other key is depressed, then the change-key and its printing device are locked. Whenever the drawer is opened, therefore, without the recording or registering of any transaction, a simple zero is printed in the column opposite to the change-key, so that a mark appears on the recording-strip every time the drawer is opened, thus furnishing a complete record in detail of every operation performed on the machine during any period of time.

Having thus described our invention, we claim—

1. In a cash-register, a keyboard having a series of keys arranged in groups, a series of registering-wheels also arranged in groups, each group comprising a wheel of different denomination corresponding to each group of keys, intermediate actuating devices common to all the registering-wheels and one for each denomination, each key of a series being adapted to unlock and determine the movement of the actuating device corresponding to said series, a movable part, such as a cash-drawer, adapted when released to operate said actuating devices, a pawl-lever for each registering-wheel, all the pawl-levers of one group being normally locked, and department-keys, each adapted to release the pawl-levers of one group and also the movable part, a series of printing-wheels also arranged in groups, one printing-wheel for each registering-wheel, said wheels being adapted to print on a common record-strip, and means as described for causing the printing-wheel of each registering-wheel actuated to contact with said recording-strip, substantially as specified.

2. In a cash-register, a keyboard, and a series of registering devices, each comprising a group of registering-wheels, intermediate actuating devices common to all the registering-wheels, each of the keys in one group or series being adapted to unlock and determine the movement of one of said actuating devices, means whereby the registering-wheels of any series or group may be released so as to be actuated by the actuating devices, and printing-wheels also arranged in groups, one printing-wheel for each registering-wheel, and a recording-strip common to all the printing-wheels, and means as described for causing the printing-wheels corresponding to the registering-wheels operated to be brought in contact with the recording-strip so as to record the number registered on said wheels and each of them, substantially as specified.

3. The combination with a keyboard having keys arranged in groups or series, one group or series for each denomination, a series of printing-wheels also arranged in groups, each group comprising a wheel for each denomination represented on the keyboard, intermediate actuating devices, each of the keys of any series being adapted to unlock and determine the movement of the actuating device of said series, a lever connected to each of said printing-wheels and adapted when released to move with the actuating device of the denomination corresponding to said wheel, department-keys for releasing the levers of any group, a recording-strip common to all the printing-wheels, and means as described for bringing said recording-strip in contact with the wheels whose levers have been released when the actuating devices are operated, substantially as specified.

4. The combination with a keyboard, and keys arranged in groups representing different denominations, intermediate actuating devices, one for each group or series of keys, each key of said group or series being adapted to unlock and determine the position of its actuating device, a series of printing-wheels, one for each denomination represented by said keys, means as described for operating each of said printing-wheels by the movement of the actuating devices of the same denomination, and a recording-strip adjacent to said printing-wheels, and a moving part, such as a cash-drawer, adapted, by its opening and closing, to operate said actuating devices, and a connection from said moving part to the recording-strip whereby said strip is moved into contact with the printing-wheels operated by the actuating devices and advanced after said contact, substantially as specified.

5. In a cash-register, a keyboard having keys arranged in groups, intermediate actuating devices, one for each group, each key of each group being adapted to release and determine the movement of its actuating device, a movable part, such as a cash-drawer, adapted to operate all of said actuating devices when released, a series of printing-wheels also arranged in groups, each group constituting a department, each of which has a wheel corresponding to each series of keys, connections from each of said wheels to the actuating devices of corresponding denomination, a recording-strip mounted on movable rollers common to all the printing-wheels, releasing-keys for each department, and means as described for causing the recording-strip to contact with the printing-wheels of that department which has been released after the same have been moved by the actuating devices, substantially as specified.

6. In a cash-register, a series of registering devices each comprising registering-wheels of different denominations, a series of printing-wheels, one for each registering-wheel, means for normally locking each registering device including the printing-wheels, intermediate actuating devices, one corresponding to each denomination represented in the respective registering devices, and a keyboard having keys arranged in series, one series for each actuating device, said actuating device being common to all the registering devices, each key of each series being adapted to release and determine the movement of the actuating device of that series, a recording-strip common to all the registering devices, means for unlocking either of the registering devices to cause its registering and printing wheels to be simultaneously actuated by the actuating devices, a recording-strip common to all the printing-wheels and adapted to contact with those printing-wheels which have been released, and a type-bar adapted to contact with said recording-strip when none of said registering devices are released, and means for withdrawing said type-bar from contact with said recording-strip when any registering device is actuated, substantially as specified.

7. In a cash-register, a series of cash-keys, and a series of normally inactive registering devices, a series of printing devices, one for each registering device, and special keys for said registering devices and said printing devices, said special keys being adapted when operated to put said registering and printing devices both into operative condition to register and record the amount indicated on said cash-keys, substantially as specified.

8. A series of cash-keys and a series of department-registering devices, a printing device for each registering device, intermediate actuating devices common to all the registering devices and printing devices, and special keys for simultaneously throwing into operative condition the registering and printing devices of each department, substantially as specified.

9. A series of department-registering devices and means for operating the same, a series of printing devices, one for each department and adapted to be operated simultaneously with the registering devices of said departments, and means for holding said registering and printing devices normally in an inoperative position, and special keys adapted to simultaneously release said printing and registering devices to cause them to act in unison from their common actuating devices, substantially as specified.

10. A series of department registering devices, and a series of printing devices, one for each department and adapted to print on a common recording-strip the amounts added on the respective registering devices, and means common to both series for operating the same.

11. A series of registering devices arranged in groups, and actuating-bars extending across all of said registering devices, movable keys for determining the movement of said actuating-bars, each of said bars representing a different denomination and having in each registering device a wheel corresponding thereto, engaging devices for said wheels actuated by said bars, printing-wheels, and connections from each of said engaging devices to a printing-wheel, a lock common to all the engaging devices of one group, and a special key for releasing said lock, and a connection from said key to its corresponding printing-wheels to cause the printing-wheels to be brought into operative position when the engaging devices are released, substantially as specified.

12. A series of cash-keys, and a series of printing-wheels, said printing-wheels being arranged in groups corresponding to departments, and intermediate actuating devices controlled by said cash-keys and adapted to operate said printing-wheels, said printing-wheels being adapted to print on a common record-strip, and special keys to throw said printing-wheels in an operative position to cause them to act on said common printing-strip, substantially as specified.

13. A series of cash-keys, and a series of printing-wheels arranged in groups, intermediate actuating devices to operate said printing-wheels, said actuating devices being controlled by the cash-keys, means for holding said printing-wheels in a normally inactive position, and special keys, one for each group, to bring said printing-wheels into an operative position, and interlocking devices connected with said special keys to lock all the other printing devices when one of said special keys is operated, substantially as specified.

14. A series of printing-wheels, cash-keys adapted through intermediate actuating devices to determine the movement of said printing-wheels, and special keys for bringing said printing devices into operative position, a cash-drawer adapted by its movement to operate said printing-wheels and a change-key adapted to unlock said drawer and at the same time lock all of said printing-wheels, a printing device connected to said change-key adapted to be brought into contact with a record-strip common to all of said printing devices when the drawer is opened by said change-key, substantially as specified.

15. A cash-register having registering devices, and printing-wheels arranged in groups, and adapted to print on a common record-strip, a series of cash-keys to control the actuating devices for said printing-wheels, means common to said registering devices and the printing-wheels to actuate the same simultaneously, means for feeding said printing-strip after the printing-wheels are operated against the same, said printing-strip being wider than the total width of said printing-wheels to form a blank space opposite the impression from either of said printing-wheels, substantially as specified.

16. The combination with a series of cash-keys and a series of printing-wheels arranged in groups, actuating devices controlled by said cash-keys and adapted to operate said printing-wheels, of a roller-frame containing a series of rollers extending across the printing-wheels of all the groups, and supporting a record-strip extending across said printing-wheels, and an inking-roller common to all of said printing-wheels and adjacent said frame, substantially as specified.

17. The combination with a series of cash-keys, of a series of printing-wheels arranged in groups, actuating devices controlled by said cash-keys and adapted to operate said printing-wheels, a pivoted frame having rollers carrying a printing-strip, an inclosing casing having an opening, one of said rollers being an impression-roller and arranged normally opposite said opening in the inclosing casing, special keys for bringing all the printing-wheels of one set or group into operative position, and means as described for oscillating said pivoted frame to carry the impression-roller opposite said printing-wheel and causing a contact between said impression-roller and printing-wheel, substantially as specified.

18. The combination with the printing-wheels and means for revolving the same, a pivoted frame having rollers supporting a record-strip, swinging arms for supporting said pivoted frame, means as described for revolving said frame to bring one of said rollers opposite said printing-wheels and for causing a movement of said frame toward said wheels by oscillating the swinging arms, substantially as specified.

19. The combination with the printing-wheels of a pivoted frame supported in swinging arms, supporting-rollers in said frame, and an impression-roller between said supporting-rollers, a printing-strip connected at each end to said supporting-rollers and passing over said impression-roller, means as described for turning said frame to bring said impression-roller opposite said printing-wheels and for moving said swinging arms to cause the strip to contact with said printing-wheels, substantially as specified.

20. The combination with the printing-wheels, rollers supporting a record-strip and an impression-roller over which said strip passes, a pivoted frame in which said rollers are journaled, swinging arms supporting said frame, means for turning said frame and oscillating said arms, and a ratchet device operated by the movement of said frame to partially revolve said rollers as said frame is moved, substantially as specified.

21. In a machine for registering and indicating the amounts of certain classes of transactions, such as cash sales, and for printing and indicating the amount of transactions of other classes, the combination of the registering mechanism, the indicating mechanism, and means for throwing or maintaining the registering mechanism out of operation when it is desired to print and indicate the amount of a transaction which is not to be registered upon the registering mechanism.

22. In a machine for registering the amounts of transactions of a given class, such as cash sales, and for recording and indicating the amounts of such transactions and also the amounts of other special classes of transactions, the combination with the operating mechanism or actuating devices of the machine, of a register positively actuated thereby to register the amounts of all cash transactions, printing and indicating devices also actuated thereby to print and indicate the amounts of all transactions of all classes, and means for rendering the registering mechanism inoperative at will whenever a transaction is to be recorded and indicated but not added upon the registering mechanism.

23. In a machine for registering the amounts of transactions of a given class, such as cash sales, and for recording and indicating the amounts of such transactions and also the amounts of other special classes of transactions, the combination, with the operating mechanism or actuating devices of the machine, of a register actuated thereby to register the amounts of all cash transactions, printing and indicating devices also actuated thereby to print and indicate the amount of all transactions of all classes, special indicating devices for indicating the character of the various transactions, and means for maintaining the registering mechanism out of operation at will when a transaction is to be recorded and indicated but not added upon the registering mechanism.

24. In a machine for registering the amounts of certain classes of transactions, such as cash sales, and for recording the amounts of transactions of other classes, the combination, with the operating mechanism, of a register adapted to be operated thereby for registering the amounts of cash transactions, printing means for printing the amounts of special transactions, value-keys for controlling the operation of the registering and printing mechanisms, a special key, means for preventing the operation of the operating mechanism until the special key is depressed, and means for maintaining the register out of operation when the special key is depressed.

25. In a machine for registering the amounts of certain classes of transactions, such as cash sales, and for recording the amounts of transactions of other classes, the combination with the operating mechanism, of a register adapted to be operated thereby for registering the amounts of cash transactions, printing means adapted to record the amounts of transactions not to be added on said register, value-keys for controlling the operation of the register and the printing means, a plurality of special keys representing different characters of transactions, means for preventing the operation of the operating devices until one of said special keys is depressed, and means for maintaining the register out of operation when any one of the said keys that does not represent cash transactions is depressed and the machine is then operated.

26. In a machine for registering and indicating the amounts of certain classes of transactions, such as cash sales, and for recording and indicating the amounts of transactions of other classes, the combination with the operating mechanism, of a register adapted to be operated thereby for registering the amounts of cash transactions, indicating devices for indicating the amounts of all transactions, printing means adapted to record the amounts of transactions not to be added upon the register, value-keys for controlling the operation of the register, the indicating devices and the printing means, a plurality of special keys representing different characters of transactions, means for preventing the operation of the operating devices until one of the special keys is depressed, and means for maintaining the register out of operation when any one of the said keys that does not represent cash transactions is depressed and the machine is then operated.

27. In a machine for registering and indicating the amounts of certain classes of transactions, such as cash sales and for recording and indicating the amounts of transactions of other classes, the combination, with the operating mechanism, of a register adapted to be operated thereby for registering the amounts of cash transactions, indicating devices adapted to be operated thereby for indicating all transactions, printing means adapted to record the amounts of transactions not to be added on the register, value-keys for controlling the operation of the register, the indicating devices and the printing means, a plurality of special keys representing different characters of transactions, means for indicating the character of the transaction made, means for preventing the operation of the operating devices until one of the said special keys is depressed, and means for maintaining the register out of operation when any one of the said keys that does not represent cash transactions is depressed and the machine is then operated.

28. In a registering-machine having operating mechanism, a register that is adapted to be operated by said mechanism, an indicating and a printing device, said devices being operated by said mechanism to indicate and record both the value and the character of every transaction, and means for rendering the register inoperative when a transaction is to be indicated and recorded that is not to be added on the register.

29. In a machine for indicating and recording the values and the character of transactions of various kinds, an operating mechanism that is normally held against movement, a special key representing "cash" transactions, a register that is adapted to be operated when the said special key is depressed and the operating mechanism released, a second special key representing transactions other than "cash" sales, means whereby the said register is thrown or maintained out of operative condition when the said second special key is depressed, means controlled by the latter key for releasing the operating mechanism, and a recording device for taking a permanent record of all transactions of all kinds.

30. In a cash-register, a plurality of registers, an operating mechanism therefor, means whereby any one of said registers may be caused to be operated by said mechanism, a bank of keys adapted to control any register and a recording device adapted to produce a record showing which of the said registers has been operated.

31. In a cash-register, a plurality of registers, an operating mechanism therefor, means whereby any one of said registers may be caused to be operated to the exclusion of all the other registers, a bank of keys adapted to control any register and a recording device adapted to produce a record showing which of the said registers has been operated.

32. In a cash-register, a printing device, a value-key and a department-key, and means requiring the operation of both of said keys before said printing device can be operated.

33. In a cash-register, a registering device, a printer, operating mechanism therefor, a series of keys for determining the movements of said registering and printing mechanism, means for rendering the said registering device inoperative with relation to the said mechanism, a special key for controlling said means, and interlocking mechanism to prevent the simultaneous depression of the cash and special keys.

34. In a cash-register, a registering device, operating mechanism therefor, a series of value-keys for determining the movements of said mechanism, means for throwing or maintaining the said registering device out of operative relation with the said mechanism a special key for controlling said means, interlocking mechanism to prevent the simultaneous depression of the value and the special keys, and a recording device operated by said mechanism and adapted to show that the special key has been depressed.

35. In a cash-register, a transverse shaft, register-operating mechanisms mounted on said shaft, keys for determining the extent of movement of said operating mechanisms, means for normally locking said mechanisms against operation, a plurality of special keys, means operated by either of said special keys for unlocking said mechanisms, a recording device and means controlled by said special keys for causing said recording device to show the character of the transaction.

36. In a cash-register, a series of special keys, an operating mechanism, means actuated by said keys for releasing said mechanism, a recording device adapted to show which of said keys had been used to release the mechanism, and means to prevent the simultaneous operation of two or more of said keys.

37. In a cash-register, a registering device, an operating mechanism therefor, a depressible key, means whereby the register is actuated after said key is depressed and when the said mechanism is operated, a second depressible key, means for throwing or maintaining said registering device out of operation when said second key is depressed, and a recording device adapted to show which of the said keys has been depressed.

38. In a cash-register, a plurality of registering devices, an operating mechanism therefor, means whereby any one of said registering devices may be placed in operative relation with said mechanism, an indicating device for showing at each operation of the machine which register is operating, and a recording device for keeping a continuous record of the various indications.

39. In a cash-register, a series of registering devices, an operating mechanism for said devices, means for placing any one of the said devices into operative relation with the operating mechanism at will, means to prevent the simultaneous operation of a second registering device, and a recording mechanism for showing which register has been operated.

40. In a cash-register, a transverse shaft, register-operating mechanisms mounted on said shaft, keys for determining the extent of movement of said operating mechanisms, means for normally locking said mechanisms against operation, a plurality of special keys, means operated by said keys for unlocking said mechanisms, and a recording device adapted to show which of said special keys has been operated.

41. In a cash-register, a registering device, means for maintaining the same out of operation, and a printing device adapted to produce a record showing that the register has not been operated.

42. In a cash-register, adapted to the use of a plurality of clerks or departments, a plurality of devices for separating the transactions of each clerk or department, and an additional means for recording and identifying the transactions in each of said departments.

43. In a cash register and indicator adapted to the use of a plurality of clerks or different characters of transactions, a plurality of devices for showing the variable amount or values of the total transactions of each clerk or each character of transactions, an additional means from which the same information can be obtained, said additional means affording a basis of comparison of the information furnished by the first means.

44. In a cash-register adapted to the use of a plurality of clerks or departments, a plurality of devices from which the total amount of the transactions by each clerk or department can be obtained, and a printing device for recording and identifying the transactions of each clerk or department, said printing device furnishing means for comparison with the total transactions in each of the first-mentioned devices.

45. In a cash-register adapted to the use of a plurality of clerks or departments, a plurality of devices for separating the transactions of each clerk or department, and showing the total thereof, a printing device for recording and identifying each transaction of each of the clerks or departments, whereby the same information as to the transactions in different departments may be obtained from different sources.

46. In a cash-register, a series of pairs of normally inoperative registers and recorders, means for operating the same, and means for rendering each of said pairs operative or inoperative as desired.

47. In a cash-register, a series of registers, separate means for operating each register, means for normally locking each of said operating means, a series of keys, one key for each register, by the depression of which the corresponding operating means is unlocked, and a printing device adapted to produce a record showing which of the operating means has been unlocked.

48. In a registering-machine, a series of registers, separate devices for operating the registers, a series of sets of recorders set from said operating devices, means for normally locking each of said devices, and means for unlocking any register and recorder desired.

49. In a cash-register, a bank of cash or value keys, a series of normally inoperative registers, a swinging frame controlled by said bank of keys, means for operating said registers from said frame, means for rendering operative any desired register, and means controlled by said frame for recording the amount added upon the register.

50. In a cash-register, a series of printing devices normally held out of printing position, means for setting any desired printer for printing the transaction and for throwing said printer into printing position, a platen carrying a strip of paper, and means for moving said platen and paper into contact with said printer.

51. In a cash-register, a plurality of department registering devices, means for operating the same, a plurality of printing devices, one for each department, and mechanism common to both series for setting the register-operating means and the printing devices simultaneously.

52. In a cash-register, a printing device, a value-key, and means for locking said printing device out of operative position upon the depression of said key.

53. In a cash-register, a recording device which is normally out of operative position, a value-key, a department-key, and means requiring the operation of both of said keys for placing said recording device in its operative position.

54. In a cash-register, a recording device that is normally out of inoperative position, a rock-shaft, and means on said shaft for throwing the recording device into operative position and for locking it into such position.

55. In a registering-machine, a plurality of sets of registering-wheels, a series of printing devices, and connections between said sets of registering-wheels and their corresponding printing devices such that each amount added on a register-wheel will be printed by the corresponding printing device.

56. In a cash-register, a series of sets of recorders, separate means for operating each of said sets of recorders, mechanism for normally locking each of said sets of recorders, and means for unlocking and rendering operative any recorder desired.

57. In a cash-register, the combination with a registering device, of a main yoke, a series of auxiliary yokes operated by the same, graduated stop-segments connected to said yokes, keys for limiting the movements of said segments, a printer including type-carriers, and means connecting the type-carriers to the respective segments.

58. In a cash-register, the combination with a registering device, of a main yoke, a series of auxiliary yokes operated by the same, graduated stop-segments connected with said auxiliary yokes, keys for controlling the movements of said segments, and type-carriers connected with the auxiliary yokes.

59. In a cash-register, the combination with a registering device, of a main yoke, a series of auxiliary yokes operated by the same, graduated stop-segments connected with said auxiliary yokes, means for limiting the movements of the segments, and a printer including type-carriers, said type-carriers being moved proportionately with the segments.

60. In a cash-register, a main yoke, a series of auxiliary yokes operated thereby, graduated stop-segments connected with the auxiliary yokes, means for limiting the movements of the segments, and a registering device, said device being operated proportionately with the segments.

61. In a cash-register, the combination with registering devices, of a main operating-yoke, a series of auxiliary yokes, devices for controlling the movements of these latter yokes, a printing device including type-carriers and means connecting the type-carriers to the respective auxiliary yokes.

62. In a cash-register, a registering device, a special key, means for maintaining the register out of operation when the key is actuated, a special indicator under the control of the special key, a bar for turning the indicator, said bar having a shoulder, a plate for engaging said shoulder and holding the indicator in set position between operations of the machine, and a recording device adapted to produce a record showing that the register has not been operated.

63. In a cash-register, a registering device, a special key, means for maintaining the register out of operation when the key is actuated, a special indicator under control of the special key, means for holding the indicator in its set position between successive operations of the machine and a recording device adapted to produce a record showing that the register has not been operated.

64. In a paper-feeding device for cash-registers, a supply-roller, a take-up roller, and a feed-roller, movable bearings for said take-up roller, and a spring for the latter roller which presses the same between the supply and the feed rollers.

65. In a cash-register, two separate recorders, a value-key, and means for placing one recorder in operative condition and locking the other recorder out of operative condition upon the depression of said key.

66. In a cash-register, the combination with a main yoke, of a series of auxiliary yokes operated thereby, means for limiting the movements of the auxiliary yokes, a series of type-carriers, means for maintaining an unbroken connection between the auxiliary yokes and type-carriers, a series of indicators, and means for connecting the indicators to the auxiliary yokes while the latter are moving in one direction only.

67. In a cash-register, the combination with a main yoke, of a series of auxiliary yokes operated thereby, means for limiting the movements of the auxiliary yokes, a series of type-carriers, means for maintaining an unbroken connection between the type-carriers and the auxiliary yokes, a platen, and means for returning the auxiliary yokes arranged to first operate the platen.

In testimony whereof we have hereunto set our hands this 15th day of March, A. D. 1895.

JOHN H. McCORMICK.
JAMES D. MORRISON.

Witnesses:
FRANK G. FULLINGTON,
EDWARD STALTER.